United States Patent
Whitty

(10) Patent No.: US 7,522,790 B1
(45) Date of Patent: Apr. 21, 2009

(54) OPTICAL COMMUNICATIONS SYSTEM WITH SELECTIVE BLOCK/ADD CAPABILITY OF AN OPTICAL CHANNEL

(75) Inventor: James R. Whitty, Midland (CA)

(73) Assignee: Raytheon Company, Waltham, MA (US)

(*) Notice: Subject to any disclaimer, the term of this patent is extended or adjusted under 35 U.S.C. 154(b) by 660 days.

(21) Appl. No.: 10/324,925

(22) Filed: Dec. 20, 2002

(51) Int. Cl.
*G02B 6/28* (2006.01)

(52) U.S. Cl. .............................. 385/24; 385/31; 398/45; 398/83

(58) Field of Classification Search .................. 385/24, 385/31, 32, 34, 88, 89, 92, 94; 398/82, 83, 398/88, 79, 45
See application file for complete search history.

(56) References Cited

U.S. PATENT DOCUMENTS

| | | | | |
|---|---|---|---|---|
| 4,244,045 A | | 1/1981 | Nosu et al. ..................... 398/86 |
| 4,482,994 A | | 11/1984 | Ishikawa ..................... 398/86 |
| 5,488,500 A | * | 1/1996 | Glance ......................... 398/85 |
| 5,583,683 A | | 12/1996 | Scobey ......................... 398/79 |
| 5,612,805 A | * | 3/1997 | Fevrier et al. ................. 398/83 |
| 5,717,795 A | * | 2/1998 | Sharma et al. ................. 385/24 |
| 5,771,112 A | * | 6/1998 | Hamel et al. .................. 398/83 |
| 5,859,717 A | | 1/1999 | Scobey et al. ................. 398/79 |
| 5,867,289 A | * | 2/1999 | Gerstel et al. ................. 398/12 |
| 5,905,827 A | | 5/1999 | Naganuma et al. ............ 385/31 |
| 5,943,454 A | * | 8/1999 | Aksyuk et al. ................. 385/22 |
| 6,008,920 A | | 12/1999 | Hendrix ....................... 398/79 |
| 6,031,946 A | * | 2/2000 | Bergmann et al. ............. 385/18 |
| 6,289,148 B1 | * | 9/2001 | Lin et al. ...................... 385/24 |
| 6,424,757 B1 | * | 7/2002 | Sparks et al. ................. 385/16 |
| 6,591,031 B2 | * | 7/2003 | Wu et al. ...................... 385/18 |
| 6,625,340 B1 | * | 9/2003 | Sparks et al. ................. 385/18 |
| 2004/0208584 A1 | * | 10/2004 | Keller ......................... 398/88 |

\* cited by examiner

*Primary Examiner*—Kumiko C Koyama
(74) *Attorney, Agent, or Firm*—H. St. Julian

(57) ABSTRACT

An optical communications system has a selective block/add capability of an optical channel. An optical beam separator receives and separates an input mixed optical beam into a separated optical channel and a remainder optical beam. A block/add unit receives as an input the separated optical channel and produces as an output a controllably modified separated optical channel. The block/add unit includes a source of an add input optical signal, and a controllable mirror. The controllable mirror is controllable between a first state in which the controllable mirror does not block the path of the separated optical channel, so that the separated optical channel is the output of the block/add unit, and a second state in which the controllable mirror blocks the path of the separated optical channel, and also reflects the add input optical signal as the output of the block/add unit. An optical beam combiner receives the output of the block/add unit and combines the output of the block/add unit with the remainder optical beam.

15 Claims, 2 Drawing Sheets

OPTICAL COMMUNICATIONS SYSTEM WITH SELECTIVE BLOCK/ADD CAPABILITY OF AN OPTICAL CHANNEL

This invention relates to an optical communications system and, more particularly, to an optical communication system wherein one channel of a mixed optical beam may be selectively passed, or blocked and replaced by another signal.

BACKGROUND OF THE INVENTION

Optical communications systems encode information onto a light beam at a transmitting location, transmit the light beam through free space or a medium such as an optical fiber, and then decode the information from the light beam at a receiving location. A great deal of information may be encoded onto the light beam due to its high frequency. Additional information may be transmitted by encoding the additional information onto a second light beam having a slightly different wavelength than the first light beam, mixing the two light beams together at the transmitting location (or several different transmitting locations), transmitting the mixed light beam, separating the two light beams at the receiving location (or several different receiving locations), and then decoding the two sets of information from the two light beams. The amount of information that may be transmitted is increased yet further by using additional light beams in a similar manner, with all of the light beams at slightly different wavelengths. Each of the individual light beams is termed an "optical channel", so that the mixed light beam may be described as having a number of optical channels.

One form of the optical communications system is a point-to-point system, with a single transmitting location and a single receiving location. A more sophisticated version of the optical communications system includes a number of nodes. Some processing of the mixed light beam may be required at each of nodes. That is, it is ordinarily not the case that there is a single input location for all of the optical channels, and a single output location for all of the optical channels. Nor is it the case that an individual optical channel will always be utilized for a single type of information. For example, individual optical channels may be tapped or extracted from the mixed optical beam at one of the nodes, and/or new information may be added to an individual optical channel to replace that being carried on the optical channel up to that point.

Hardware in the form of light-beam-processing equipment is required to implement these operations at the nodes. The hardware must be effective to accomplish the required manipulation of the optical beam and should desirably require minimal human technician support at the point of implementation. The present invention fulfills this need for a specific type of nodal function, and further provides related advantages.

SUMMARY OF THE INVENTION

The present invention provides an optical communications system with a selective block/add capability of an optical channel. This feature is usefully employed at nodes in the optical communications system, whereat information on a selected optical channel is to be selectively transmitted through the node or the information is to be blocked and replaced with other information. The present approach is desirably implemented with remote control capability, so that the block/add function may be selectively controlled without the need for human support at the site of the node.

In accordance with the invention, an optical communications system with selective block/add capability of an optical channel is operable with an input mixed optical beam. The optical communications system comprises an optical beam separator that receives and separates the input mixed optical beam into a separated optical channel and a remainder optical beam, and a block/add unit that receives as an input the separated optical channel and produces as an output a controllably modified separated optical channel. The controllably modified separated optical channel is selectable between the separated optical channel and an add input optical signal. An optical beam combiner receives the output of the block/add unit and combines the output of the block/add unit with the remainder optical beam.

The block/add unit preferably comprises a source of an add input optical signal, and a controllable mirror. The controllable mirror is controllable between a first state in which the controllable mirror does not block the path of the separated optical channel, so that the separated optical channel is the output of the block/add unit, and a second state in which the controllable mirror blocks the path of the separated optical channel, and also reflects the add input optical signal as the output of the block/add unit.

Even more preferably, the block/add unit comprises a block/add unit input collimator that transmits the separated optical channel into a free space, a block/add unit output collimator positioned to receive the transmitted separated optical channel from the block/add unit input collimator and having as an output the controllably modified separated optical channel, a block/add unit add collimator having as an output into the free space an add input optical signal, and a controllable mirror positioned in the free space between the block/add unit input collimator and the block/add unit output collimator. The controllable mirror is controllable between a first state in which the controllable mirror does not block the path of the separated optical channel between the block/add unit input collimator and the block/add unit output collimator, so that the separated optical channel propagates unmodified through the free space from the block/add unit input collimator to the block/add unit output collimator, and a second state in which the controllable mirror blocks the path of the separated optical channel between the block/add unit input collimator and the block/add unit output collimator, and also reflects the add input optical signal from the block/add unit add collimator to the block/add unit output collimator.

The optical beam separator may comprise an optical beam demultiplexer. The controllable mirror may comprise a reflective surface, and a mirror drive operable to move the reflective surface between the first state and the second state. The optical beam combiner may comprise an optical beam multiplexer.

Although the prior discussion has addressed the approach of the invention in relation to a single channel, the present approach is equally applicable to implementing the block/add function for multiple channels of the mixed optical beam or for all channels of the mixed optical beam.

The present approach provides a reliable, readily controlled approach for performing the block/add function at a node or other location of an optical communications system. Other features and advantages of the present invention will be apparent from the following more detailed description of the preferred embodiment, taken in conjunction with the accompanying drawings, which illustrate, by way of example, the

DETAILED DESCRIPTION OF THE INVENTION

Figure 1:
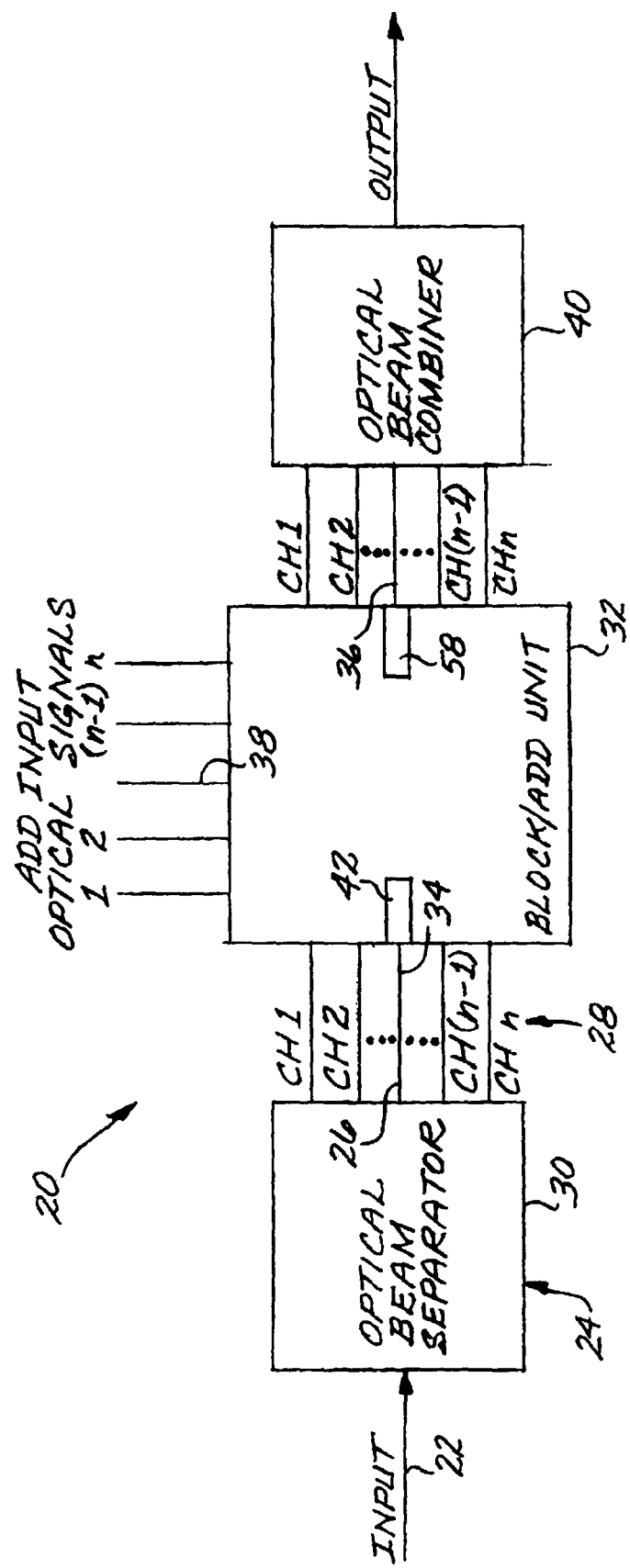
FIG. 1 is a schematic diagram of an optical communications system.

FIG. 1 depicts an optical communications system 20 with selective block/add capability of an optical channel. The optical communications system 20 is operable with an input mixed optical beam 22. The optical communications system 20 includes an optical beam separator 24 that receives and separates the input mixed optical beam 22 into a separated optical channel 26 and a remainder optical beam 28. In one embodiment, the optical beam separator 24 is a demultiplexer 30 that separates the input mixed optical beam 22 into a plurality of individual channels 1 . . . n, and the separated optical channel 26 is any of those n individual channels. Demultiplexers are known in the art, see for example U.S. Pat. Nos. 4,244,045; 4,482,994; 5,583,683; 5,859,717; 5,905,827; and 6,008,920, whose disclosures are incorporated by reference.

A block/add unit 32 receives as an input 34 the separated optical channel 26 and produces as an output 36 a controllably modified separated optical channel. The controllably modified separated optical channel that is the output 36 of the block/add unit 32 is selectable between the separated optical channel 26 and an add input optical signal 38.

An optical beam combiner 40 receives the output 36 of the block/add unit 32 and combines the output 36 of the block/add unit 32 with the remainder optical beam 28. In one embodiment, the optical beam combiner 40 is a multiplexer that combines the output 36 of the block/add unit 32 with the remainder optical beam 28. Multiplexers are known in the art, see for example U.S. Pat. Nos. 4,244,045; 4,482,994; 5,583, 683; 5,859,717; 5,905,827; and 6,008,920.

Figure 2:
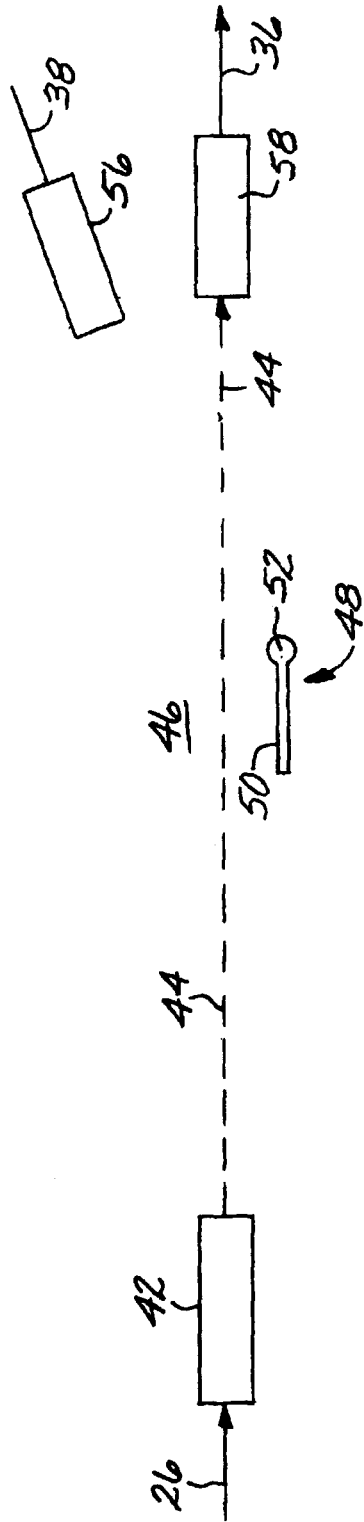
FIG. 2 is a schematic diagram of the block/add unit in its first, unblocked state.
Figure 3:
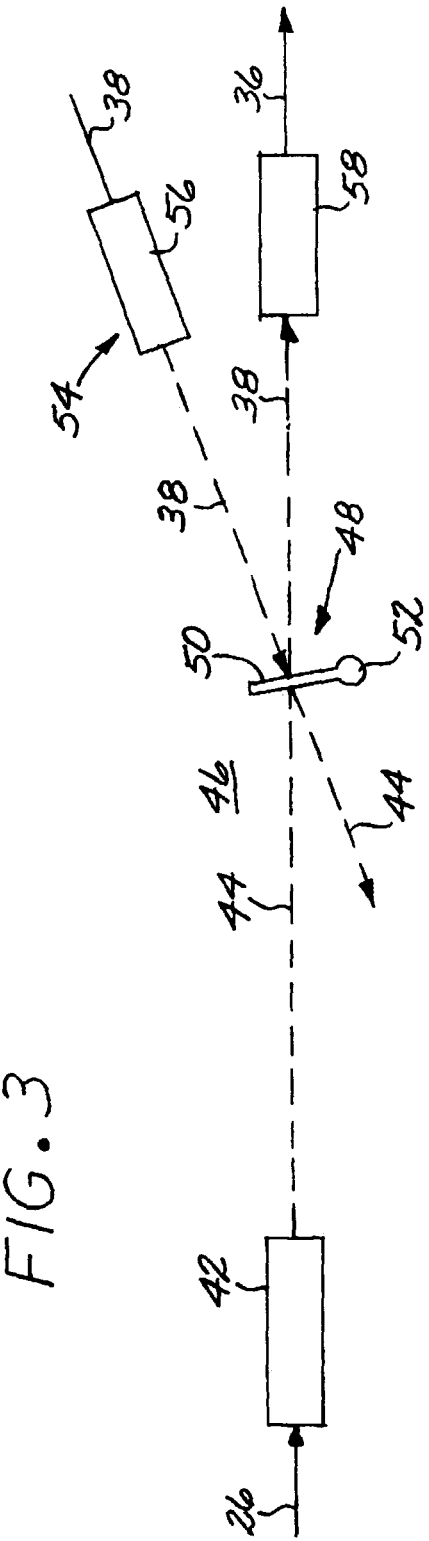
FIG. 3 is a schematic diagram of the block/add unit in its second, blocked-and-add state.

FIGS. 2-3 schematically depict the block/add unit 32 in greater detail. A block/add unit input collimator 42 receives the separated optical channel 26 and transmits the separated optical channel 26 along a beam path 44 into a free space 46. The block/add unit 32 preferably further includes a controllable mirror 48 located in the free space 46. The controllable mirror 48 may be of any operable type. In the illustrated presently preferred embodiment, the controllable mirror 48 in turn comprises a reflective surface 50 and a mirror drive 52. The mirror drive 52 is preferably an electromechanical drive, but it may be of any controllable type. The mirror drive 52 is preferably remotely controllable, so that the functioning of the block-add unit 32 may be controlled remotely and without an operator present at the site of the block-add unit 32. The mirror drive 52 is controllably operable to move the reflective surface 50 between a first state or position, shown in FIG. 2, in which the controllable mirror 48 does not block the beam path 44 of the separated optical channel 26, so that the separated optical channel is the output 36 of the block/add unit 32; and a second state or position, shown in FIG. 3, in which the controllable mirror 48 blocks the beam path 44 of the separated optical channel 26.

When the controllable mirror 48 is in the second state that blocks the beam path 44 of the separated optical channel 26, it also reflects the add input optical signal 38 provided from a source 54 of the add input optical signal 38. The source 54 of the add input optical signal 38 is preferably a block/add unit add collimator 56 that directs the add input optical signal 38 into the free space 46 to reflect from the reflective surface 50. When the controllable mirror 48 is in the second state, the reflected beam 44 may be received and used, or it may be discarded.

When the controllable mirror 48 is in the first state shown in FIG. 2, the beam path 44 of the separated optical channel 26 is received by a block/add unit output collimator 58 that is positioned to receive the output 36 of the block/add unit 32 from the controllable mirror 48, and thence becomes the output 36 of the block/add unit 32. That is, when the controllable mirror 48 is in the first state, the separated optical channel 26 propagates unmodified through the free space 46 from the block/add unit input collimator 42 to the block/add unit output collimator 58, to serve as the output 36 of the block-add unit 32. When the controllable mirror 48 is in the second state shown in FIG. 3, the add input optical signal 38 is reflected from the reflective surface 50 and into the block/add unit output collimator 58, to serve as the output 36 of the block/add unit 32.

Thus, the output 36 of the block/add unit 32 that is combined with the remainder optical beam 28 in the optical beam combiner 40 is either the separated optical channel 26 (when the controllable mirror 48 is in the first state) or the add input optical channel 38 (when the controllable mirror 48 is in the second state).

The operation of the optical communications system 20 has been described in terms of the block/add function applied to a single one of the n channels. Its use may be extended to an additional one or more of the n channels, either by providing the appropriate number of block/add units 32 or by an approach where one block/add unit performs the block/add function for multiple ones of the separated channels 26.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical communications system with selective block/add capability of an optical channel and operable with an input mixed optical beam, comprising:
    an optical beam separator that receives and separates the input mixed optical beam into a separated optical channel and a remainder optical beam;
    a block/add unit that receives as an input the separated optical channel and produces as an output a controllably modified separated optical channel, wherein the controllably modified separated optical channel is selectable between the separated optical channel and an add input optical signal, and wherein the block/add unit comprises a mirror that is controllable between
    a first state in which the controllable mirror does not block the path of the separated optical channel having a first transmitter and a first receiver, so that the separated optical channel is the output of the block/add unit;
    a second state in which the controllable mirror blocks the path of the separated optical channel, and also reflects the add input optical signal from a second transmitter to said first receiver as the output of the block/add unit, said mirror being adapted for actuation between said first state and said second state by rotation about an edge thereof; and an optical beam combiner that receives the output of the block/add unit and combines the output of the block/add unit with the remainder optical beam.

2. The optical communications system of claim 1, wherein the optical beam separator comprises an optical beam demultiplexer.

3. The optical communications system of claim 1, wherein the optical beam combiner comprises an optical beam multiplexer.

4. The optical communications system of claim 1, wherein the controllable mirror comprises a reflective surface, and a mirror drive operable to move the reflective surface between the first state and the second state.

5. The optical communications system of claim 1, wherein the block/add unit further comprises a block/add unit input collimator that transmits the separated optical channel into a free space.

6. The optical communications system of claim 1, wherein the block/add unit further comprises a block/add unit output collimator positioned to receive the output of the block/add unit from the controllable mirror.

7. The optical communications system of claim 1, wherein the controllable mirror is a pivotably controllable mirror.

8. An optical communications system with selective block/add capability of an optical channel and operable with an input mixed optical beam, comprising:

an optical beam separator that receives and separates the input mixed optical beam into a separated optical channel and a remainder optical beam, said separator providing a first source;

a block/add unit that receives as an input the separated optical channel and produces as an output a controllably modified separated optical channel, the block/add unit comprising a second source of an add input optical signal, and a controllable mirror, wherein the controllable mirror is controllable between a first state in which the controllable mirror does not block the path of the first source through the separated optical channel to a first receiver, so that the separated optical channel is the output of the block/add unit, and a second state in which the controllable mirror blocks the path of the separated optical channel, and also reflects the add input optical signal from said second source to said first receiver as the output of the block/add unit, said mirror being adapted for actuation between said first state and said second state by rotation about an edge thereof; and an optical beam combiner that receives the output of the block/add unit and combines the output of the block/add unit with the remainder optical beam.

9. The optical communications system of claim 8, wherein the optical beam separator comprises an optical beam demultiplexer.

10. The optical communications system of claim 8, wherein the controllable mirror comprises a reflective surface, and a mirror drive operable to move the reflective surface between the first state and the second state.

11. The optical communications system of claim 8, wherein the optical beam combiner comprises an optical beam multiplexer.

12. The optical communications system of claim 8, wherein the source of the add input optical signal comprises a block/add unit collimator.

13. The optical communications system of claim 8, wherein the block/add unit further comprises a block/add unit input collimator that transmits the separated optical channel into a free space.

14. The optical communications system of claim 8, wherein the block/add unit further comprises a block/add unit output collimator positioned to receive the output of the block/add unit from the controllable mirror.

15. The optical communications system of claim 8, wherein the controllable mirror is a pivotably controllable mirror.

* * * * *